United States Patent [19]
Layson

[11] Patent Number: 4,615,500
[45] Date of Patent: Oct. 7, 1986

[54] CATALYTIC CONVERTER SUPPORT HANGER

[76] Inventor: Jeffrey D. Layson, 19828 Great Oakes Cir., North, Mt. Clemens, Mich. 48043

[21] Appl. No.: 642,130

[22] Filed: Aug. 17, 1984

[51] Int. Cl.⁴ .............................................. F16L 3/08
[52] U.S. Cl. ........................................ 248/65; 248/62
[58] Field of Search ................... 248/60, 62, 61, 65, 248/68, 58, 70, 74.4, 74.1, 59; 285/15, 16

[56] References Cited

U.S. PATENT DOCUMENTS

| | | | |
|---|---|---|---|
| 1,131,867 | 3/1915 | Pyle | 248/65 |
| 2,454,064 | 11/1948 | Johnson | 248/74.4 |
| 2,842,218 | 7/1958 | Bradbury | 248/62 |
| 3,199,815 | 8/1965 | Martinkovic | 248/62 |
| 4,068,854 | 1/1978 | Douglass | 248/70 |

*Primary Examiner*—Reinaldo P. Machado
*Assistant Examiner*—Alvin Chin-Shue
*Attorney, Agent, or Firm*—Hauke and Patalidis

[57] ABSTRACT

A replacement support bracket and hanger for a relatively expensive component of a motor vehicle exhaust system, such as the catalytic converter, and a method of salvaging such catalytic converter through the use of said replacement bracket. The original support bracket has an aperture through which is passed the catalytic converter exhaust opening flared collar normally clamped onto the end of an exhaust gas evacuating pipe having an end rim provided with a complementary flare. The replacement support bracket has a generally U-shaped cut-out portion. After removal of the original support bracket commonly welded to the housing and to the peripheral surface of the catalytic converter collar, the replacement bracket is clamped in position with its cut-out portion disposed behind the flared neck simultaneously with the pipe end being coupled to the converter flared collar by the same, or similar, clamping bolts and nuts originally used for only clamping the pipe end to the converter collar.

5 Claims, 4 Drawing Figures

U.S. Patent  Oct. 7, 1986  4,615,500
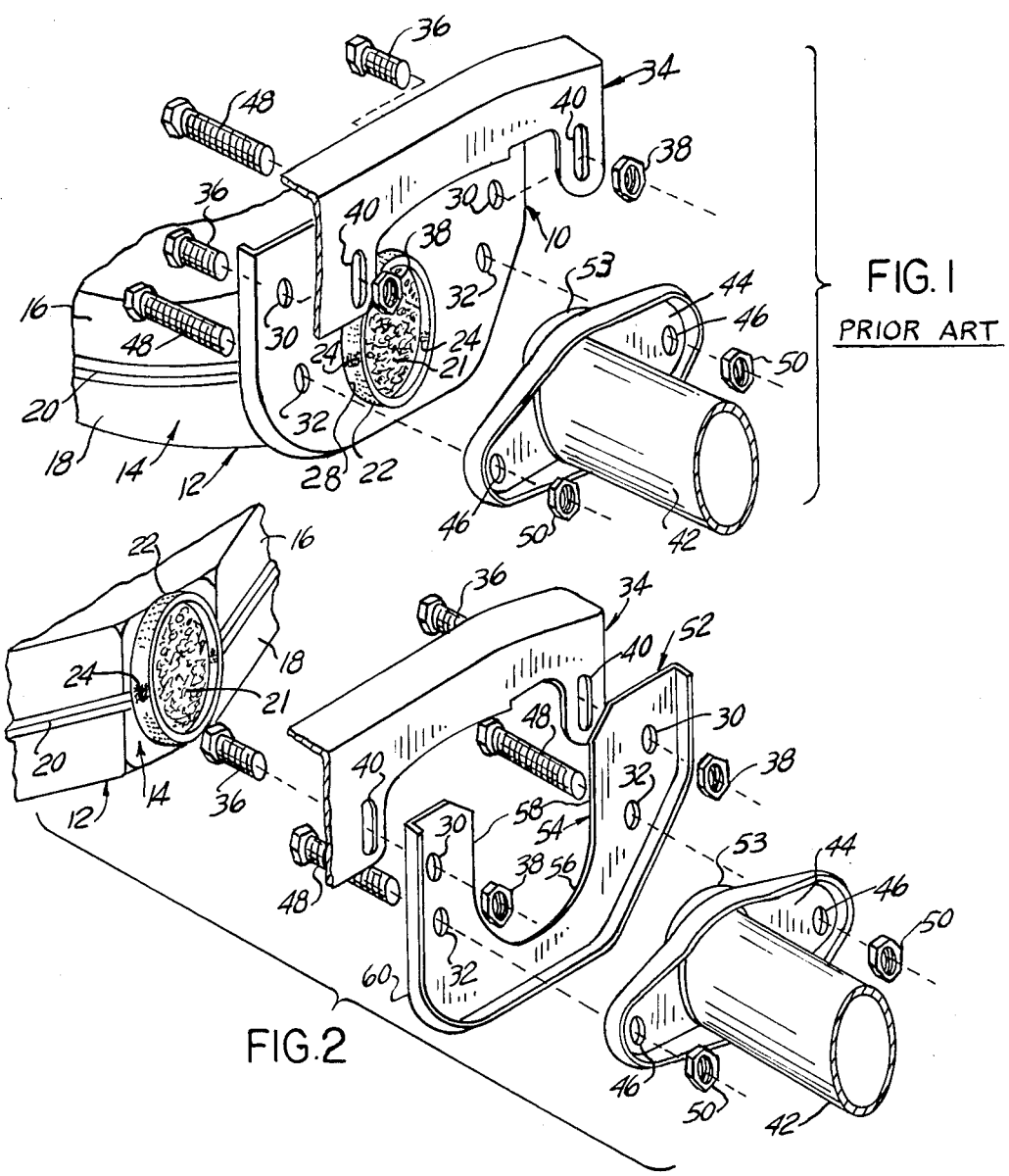
FIG. 1 PRIOR ART
FIG. 2
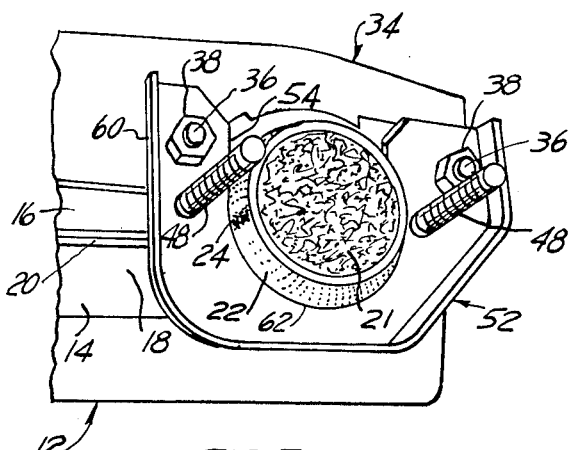
FIG. 3
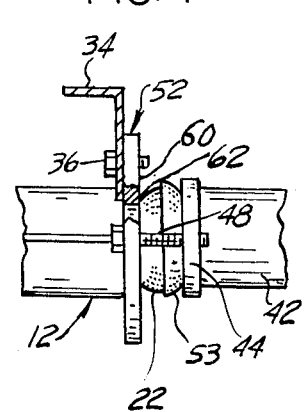
FIG. 4

CATALYTIC CONVERTER SUPPORT HANGER

BACKGROUND OF THE INVENTION

The present invention relates to a motor vehicle exhaust support hanger, in general, and more particularly to a support hanger or bracket for a catalytic converter, and to a method for salvaging catalytic converters.

Emission control systems for internal combustion engines, and more particularly for motor vehicle internal combustion engines, utilize a catalytic converter connected in the engine exhaust between the exhaust manifold and the muffler. Catalytic converters generally take the form of a gas expansion housing containing a metallic mesh and catalyst combination capable of exothermally reducing nitrogen oxides while oxidizing carbon monoxide and hydrocarbons present in the exhaust gases of the engine. The exothermic reaction generates considerable heat which subjects the converter housing to a succession of heating cycles while the engine is running, and cooling cycles while the engine is shut off. The housing of the catalytic converter is often formed of heavy gauge steel material, often a stainless steel, and it is sometimes provided with shallow embossed ribs to allow the housing to be subject to successive cycles of expansion and contraction without cracking.

Catalytic converters are supported from the frame of the motor vehicle, as close to the engine as feasible, in a substantially horizontal position below the frame, by means of a stamped bracket. The catalytic converter housing is made of two half shells welded together such as to form the full housing. Each half shell includes a half portion of an integrally formed inlet annular neck and outlet annular neck for connection, respectively, to the exhaust pipe and to a pipe connecting the catalytic converter to the muffler. The support bracket has mounting apertures for bolting to a frame member, and a circular aperture through which the exhaust tubular outlet collar is passed prior to flaring the rim of the tubular neck for junction to the complementarily flared end rim of the pipe. The bracket is welded to the outlet collar behind the flared-out portion of the collar. The flared collar is fastened to the complementarily flared end rim of the pipe by way of an appropriate flange mounted on the end of the pipe and having mounting apertures aligned with corresponding mounting apertures on the bracket for passage therethrough of bolts which, when tightened, provides a secure junction of the converter outlet collar and pipe inlet flared rim.

Such an installation for a catalytic converter placed in series in the exhaust system of a motor vehicle powered by an internal combustion engine is generally satisfactory when the motor vehicle is placed in service, and for a few years thereafter. However, progressive deterioration of the converter housing, of the support bracket itself, and more particularly of the weld fastening the support bracket to the converter housing outlet collar takes place after a period of time depending on the type of service imposed upon the vehicle, light duty or heavy duty, the frequency of the heating to cooling cycles to which the catalytic converter is subjected, and the ambient or surrounding in which the motor vehicle is operated. In time, fatigue, corrosion and oxidation which, apparently, is accelerated more particularly at the weld in view of the difference in the metallurgy of the bracket, the converter housing and the weld seam, cause the bracket and the converter outlet collar to become detached. This in turn causes gas leakage at the junction between the converter outlet flared collar and the pipe inlet flared rim, as the clamping bolts are no longer able to draw the pipe flange tightly towards the loose and relatively fragile and bendable bracket, in view of the excessive reduction in thickness of the bracket due to corrosion and, eventually, the combined effect of shock and vibrations may result in rupture of the bracket due to the reduction in strength of the fatigued and corroded metal of the bracket itself. The repair hitherto available when a catalytic converter support bracket fails is full replacement of the whole converter by a new one having an appropriate welded-on support bracket which, evidently, is a very costly operation in view of the high cost of catalytic converters.

SUMMARY OF THE INVENTION

The present invention provides a catalytic converter replacement hanger or support bracket which permits to reattach a motor vehicle catalytic converter in its original position, without dismantling the exhaust system of the motor vehicle and without requiring replacement of the catalytic converter by a new unit. The present invention provides such a support bracket at low cost, and it permits to effectuate such a repair even in the field and without removing the motor vehicle from service for any extended period of time.

In addition, the present invention permits to extend considerably the lifespan of automotive exhaust system catalytic converter without requiring welding, and without requiring additional clamping means for attaching the inlet of the pipe connected to the outlet of the catalytic converter.

The many objects and advantages of the present invention will readily become apparent to those skilled in the art when the following description of the best mode contemplated at the present for practicing the invention is read in conjunction with the accompanying drawing wherein like numerals refer to like or equivalent elements and in which:

BRIEF DESCRIPTION OF THE DRAWING

FIG. 1 is an exploded perspective schematic view of the elements forming the support structure of a motor vehicle catalytic converter and connecting means for coupling the converter outlet to an exhaust gas evacuating pipe, according to the prior art;

FIG. 2 is an exploded perspective schematic view of the structure for supporting a catalytic converter and coupling its outlet to an exhaust gas evacuating pipe incorporating the support and clamping bracket of the present invention;

FIG. 3 is a perspective view of the support bracket of the present invention installed in position prior to coupling an exhaust gas evacuating pipe to the outlet of a catalytic converter; and FIG. 4 is a side elevation schematic view of the full assembly of the elements illustrated in exploded view of FIG. 2.

DETAILED DESCRIPTION OF THE PREFERRED EMBODIMENT

Referring now to the drawing, the present invention provides a replacement hanger or support bracket for the support bracket 10 of a catalytic converter 12 forming part of the exhaust system of a motor vehicle internal combustion engine, not shown. The catalytic converter 12 has a housing 14 formed of two half shells 16 and 18 which, after installation in the housing 14 of the internal parts are welded along a seam 20. The housing 14 of the catalytic converter 12 has an outlet, now shown, and an outlet 21 which is provided with a flanged collar 22 formed of two halves, one of which is made integrally with the half shell 16 and the other with the half shell 18, and which are also welded together along a junction 24 which is subsequently ground off relatively smooth. The bracket 10 is in the form of a relatively thin steel stamping which, in some structures, may be provided with a partial peripheral flange-like wall 26. The bracket 10 has an opening 28 through which is passed the catalytic converter flared outlet collar 22, and it is integrally joined to the housing 14 by being welded at the edge of the opening 28 to the surface of the housing where it merges into the outlet collar 22. The outlet collar 22 is flared such as to provide it with a generally partially spherical peripheral surface either prior to welding the support bracket 10 to the catalytic converter 12, or after the welding operation.

The bracket 10 is provided with two pair of mounting holes 30 and 32. The mounting holes 30 are for bolting to a support member 34 forming part of, or attached to, the frame of the motor vehicle, not shown, by means of bolts 36 and nuts 38, each bolt 36 being passed through a mounting aperture 30 and a corresponding mounting slot 40 in the support member 34. The exhaust gases exhausting through the outlet opening 21 of the catalytic converter 12 are ducted through a pipe 42 provided with a clamping flange 44 having a pair of mounting holes 46 aligned with the holes 32 in the bracket 10, bolts 48 being passed through the mounting holes, and the combination of the bolts 48 and of corresponding nuts 50 being used to draw the flared rim 52 of the pipe 42 projecting beyond the clamping flange 44 in engagement with the flared collar 22 of the converter outlet opening 21. The flared rim 52 of the pipe 42 has a curvature such as to define an internal surface, generally partially spherical, corresponding to the outer surface of the converter flared collar 22.

After a relatively short period after being placed in service, depending upon the inclement ambient in which the motor vehicle is operated, such as being subjected to chemicals or saline sprays, or to salt-laden atmospheric surroundings, to acid and the like having a strong corrosive action upon steel, combined with the stress imposed upon the weld between the bracket 10 and the catalytic converter housing 14 resulting from successive heating and cooling cycles, the bracket 14 becomes literally eaten way by rust and corrosion, and the weld deteriorates to the point that the bracket 10 may become detached from the catalytic converter housing 14. Although this progressive deterioration may remain unnoticed at first, it may eventually cause complete separation of the support bracket 10 from the catalytic converter 12 or rupture of the bracket. As the bracket 10 is an integral part of the catalytic converter 12, as originally manufactured, a convenient and conventional mode of repair is to replace the catalytic converter by a new one, at a cost of a few hundred dollars. Such a practice is pure economic waste, as the catalytic converter is generally quite capable of providing several more years of efficient service.

The present invention takes the form of a catalytic converter replacement support bracket 52, FIGS. 2-4, permitting to effectuate a repair at a cost of only a few dollars. The replacement bracket 52 takes the form of a heavy sheet steel stamping, generally U-shaped as a result of being provided with a cut-out portion 54 having a semi-circular bottom portion 56 and a pair of parallel straight sides 58, FIG. 2. The support bracket or plate 52 is provided with a formed bent-over perimeter wall 60, disposed substantially at right angle to the plane of the plate, providing added rigidity and strength, and with a pair of mounting holes 30 and a pair of clamping holes 32.

A repair is effected by removing any portion of the original corroded support bracket 10 by means of ordinary tinsmith snips, which is an easy operation to effectuate in view of the thinness of the bracket and its advanced state of corrosion, and to support the catalytic converter housing 14 by means of the replacement support bracket 52 which is positioned with its cut-out portion 54 pushed behind the flared collar 22 of the catalytic converter outlet opening 21. The distance separating the cut-out portion lateral edges 58 is such as to fit the reduced diameter portion 62 behind the flared collar 22 at the junction of the collar with the catalytic converter housing 14, as best shown at FIGS. 3 and 4, with the semi-circular bottom edge 56 of the cut-out portion 54 engaged with a portion, extending over an arc of about 180° in engagement with the periphery of the reduced diameter portion 62. The replacement support bracket 52 is attached to the front vertical surface of the support member 34 by means of the mounting bolts 36 and nuts 38, the bolts being passed through the mounting slots 40 of the support member 34. The clamping bolts 48 are passed through the bracket mounting holes 32 and through the mounting holes 46 of the pipe mounting flange 44, and the flared end rim 52 of the pipe 42 is coupled to the catalytic converter flared outlet collar 22 by tightening the clamping bolts 48 and clamping nuts 50, FIG. 2. During clamping of the flared end rim 52 of the pipe 42 in engagement with the flared collar 22, the lateral edges 58 and the semi-circular bottom edge 56 of the bracket cut-out portion 54 are sturdily and clampingly engaged with the surface of the collar 22 behind its flared portion at, or proximate to, the collar reduced diameter portion 62.

It will be appreciated by those skilled in the art that the replacement hanger or bracket 52 of the invention thus provides a convenient and low cost structure for supporting, and consequently salvaging, costly automotive accessories such as catalytic converters which, otherwise, would have been discarded and replaced by new units provided with a built-in support bracket. It will be further appreciated that by proper tightening of the clamping bolts 48 and nuts 50, the bracket 52 is solidly clamped in position behind the flared portion of the catalytic converter coupling collar 22 and, being made of relatively heavy gauge steel sheet or plate, it will last for the remaining of the useful life of the catalytic converter.

Having thus described the present invention by way of an example of structure well designed for accomplishing the objects of the invention, modifications whereof will be apparent to those skilled in the art, what is claimed as new is as follows:

1. A replacement hanger bracket for a catalytic converter housing and the like having an exhaust gas flow opening, said bracket comprising a single plate, a substantially U-shaped cut-out portion open to one side of said plate, said substantially U-shaped cut-out portion having a pair of substantially parallel straight edge portions joined by a semi-circular edge portion, said semi-circular edge portion being adapted to engage a portion of the periphery of an annular flared collar surrounding said exhaust gas flow opening behind said annular flared collar, said substantially parallel straight edge portions being separated by a distance less than the largest diameter portions of said annular flared collar, said plate having mounting holes for fastening to a support member forming part of a motor vehicle frame and a pair of additional holes disposed symmetrically relative to said cut-out portion, each of additional holes being aligned with a corresponding hole in a clamping flange fastened to an end of an exhaust gas evacuating pipe, the end of said pipe having a flared rim and a pair of threaded clamping fasteners passed through said aligned holes for drawing said clamping flange towards said plate, whereby said pipe is coupled at its flared rim end to said annular flared collar and said plate is clamped about the edges of said cut-out portion behind and against said enlarged diameter flared collar.

2. The support bracket of claim 1 wherein said plate has an integral bent-over perimeter wall disposed along a major portion of the perimeter of said plate.

3. A method of salvaging an otherwise serviceable component of a motor vehicle exhaust system, said component being originally provided with a support bracket having an opening through which is disposed an outwardly flared collar surrounding an opening for passing exhaust gases between said component and an exhaust gas evacuating pipe wherein said bracket is welded to said collar along the edge of said opening in said support bracket, said pipe having a correspondingly flared end portion and a clamping flange disposed between said flared end portion, said method comprising removing said support bracket, disposing a replacement support bracket in the form of a single plate having a substantially U-shaped cut-out portion relative to said outwardly flared collar such that said cut-out portion has edges placed behind said outwardly flared collar, attaching said plate to a support member for said original bracket and clamping said outwardly flared collar in engagement with said pipe correspondingly flared end by passing bolts through holes disposed in said plate and aligned with holes in said pipe flange and tightening nuts over the end of said bolts projecting beyond said pipe flange, whereby said plate supports said component and is attached to said flared collar by clamping engagement behind said flared collar.

4. The method of claim 3 wherein said plate has an integral bent-over perimeter wall disposed substantially at right angle to said plate.

5. The method of claim 3 wherein said component is a catalytic converter.

* * * * *